United States Patent [19]

Loftus et al.

[11] Patent Number: 5,571,610

[45] Date of Patent: Nov. 5, 1996

[54] GLASS MAT THERMOPLASTIC PRODUCT

[75] Inventors: James E. Loftus; Michael T. Pellegrin; Patrick L. Ault, all of Newark; Randall M. Haines, Frazeysburg; Virgil G. Morris, Newark, all of Ohio

[73] Assignee: Owens Corning Fiberglass Technology, Inc., Summit, Ill.

[21] Appl. No.: 573,079

[22] Filed: Dec. 15, 1995

Related U.S. Application Data

[63] Continuation-in-part of Ser. No. 473,600, Jun. 7, 1995, which is a continuation-in-part of Ser. No. 481,029, Jun. 7, 1995, which is a continuation of Ser. No. 79,413, Jun. 21, 1993, Pat. No. 5,490,961, which is a continuation-in-part of Ser. No. 473,600, which is a continuation of Ser. No. 78,909, Jun. 21, 1993, Pat. No. 5,458,822.

[51] Int. Cl.⁶ .................................................. B32B 15/00
[52] U.S. Cl. ........................ 428/285; 428/284; 428/297; 428/298; 428/902
[58] Field of Search ................................. 428/284, 285, 428/297, 298, 902

[56] References Cited

U.S. PATENT DOCUMENTS

| | | |
|---|---|---|
| 2,835,020 | 5/1958 | Doe . |
| 3,442,751 | 5/1969 | Langlois . |
| 3,669,638 | 6/1972 | Wong . |
| 3,676,242 | 7/1972 | Prentice . |
| 3,824,086 | 7/1974 | Perry . |
| 3,865,661 | 2/1975 | Hata . |
| 4,098,943 | 7/1978 | Degginger . |
| 4,201,247 | 5/1980 | Shannon . |
| 4,224,373 | 9/1980 | Marzocchi . |
| 4,448,917 | 5/1984 | Black . |
| 4,612,238 | 9/1986 | DellaVecchia . |
| 4,643,940 | 2/1987 | Shaw . |
| 4,654,100 | 3/1987 | Yats . |
| 4,656,081 | 4/1987 | Ando . |
| 4,751,134 | 6/1988 | Chenoweth . |
| 4,917,715 | 4/1990 | Kaveh . |
| 5,011,523 | 4/1991 | Roncato . |
| 5,123,949 | 6/1992 | Thiessen . |
| 5,185,117 | 2/1993 | Hawley . |
| 5,316,561 | 5/1994 | Roncato . |
| 5,328,493 | 7/1994 | Roncato . |
| 5,458,822 | 10/1995 | Bakhshi et al. ........................ 264/6 |
| 5,470,632 | 11/1995 | Meldner et al. ..................... 428/298 |

FOREIGN PATENT DOCUMENTS

| | | |
|---|---|---|
| 0148760 | 7/1985 | European Pat. Off. . |
| 2312816 | 1/1976 | Germany . |

OTHER PUBLICATIONS

Euro Producers Get Set For The Action Reinforcements Fillers Climb Higher Performance Hurdles
A Revolutionary New Class Of Reinforced Thermoplastics.
New Reinforced Thermoplastic Process For Large Parts.
Plastics and Rubber Weekly.

Primary Examiner—James J. Bell
Attorney, Agent, or Firm—C. Michael Gegenheimer; Inger H. Eckert

[57] ABSTRACT

A composite sheet is made of a moldable resin and reinforcement fibers, where the resin is a thermoplastic resin, thermosetting resin or mixture thereof, and the reinforcement fibers are fibers centrifuged from a rotary process fiberizer, where the composite sheet has at least 5 distinct layers of reinforcement fibers per mm of thickness. The composite sheet has at least 10 distinct layers of reinforcement fibers, and preferably at least 30 distinct layers. At least 85 percent of the reinforcement fibers are monofilaments, and the reinforcement fibers are wool glass fibers.

19 Claims, 3 Drawing Sheets

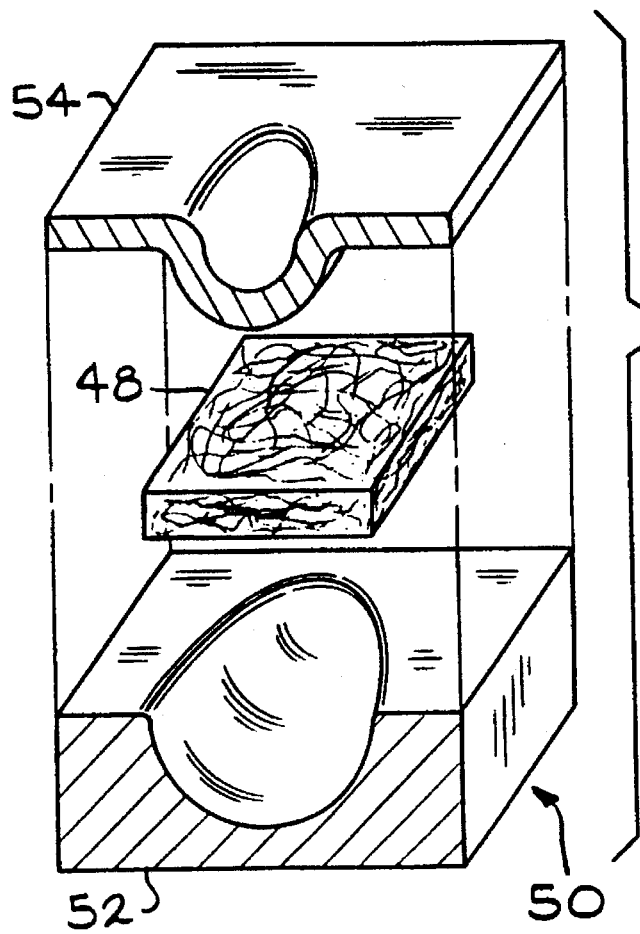
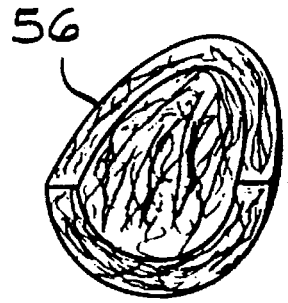
FIG. 2
FIG. 3
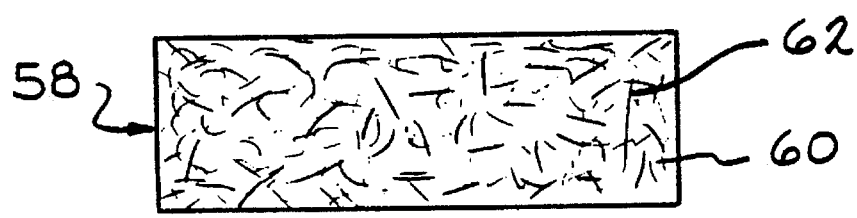
FIG. 4 PRIOR ART
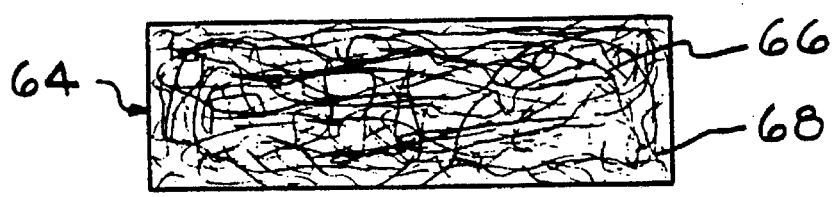
FIG. 5 PRIOR ART

GLASS MAT THERMOPLASTIC PRODUCT

RELATED APPLICATION

The present application is a continuation-in-part of commonly assigned, copending U.S. patent application Ser. No. 08/473,600 filed Jun. 7, 1995, and entitled METHOD FOR MANUFACTURING A MINERAL FIBER PRODUCT pending which is a continuation of U.S. patent application Ser. No. 08/078,909 filed Jun. 21, 1993, U.S. Pat. No. 5,458,822 and entitled METHOD FOR MANUFACTURING A MINERAL FIBER PRODUCT. The present application is also a continuation-in-part of commonly assigned, copending U.S. patent application Ser. No. 08/481,029 filed Jun. 7, 1995 pending and entitled METHOD FOR MANUFACTURING A MINERAL FIBER PRODUCT, which is a continuation of U.S. patent application Ser. No. 08/079,413 filed Jun. 21, 1993, U.S. Pat. No. 5,490,961 and entitled METHOD FOR MANUFACTURING A MINERAL FIBER PRODUCT.

TECHNICAL FIELD

This invention relates to composite sheets suitable for molding into articles of manufacture. More particularly, this invention relates to composite sheets of a moldable resin and mineral fiber reinforcement materials.

BACKGROUND ART

Numerous articles of commerce are manufactured by subjecting a moldable composite sheet to a molding process. The moldable composite sheets usually comprise a thermoplastic resin such as a polypropylene resin which is reinforced with reinforcement fibers such as a glass fiber mat. These composite sheets are commonly referred to as glass mat thermoplastics or GMT. These composite sheets can be heated to soften the resin and molded under pressure to make various articles such as pans for automobiles, cabinetry for computers and other electronic equipment, and components for small appliances and other consumer and industrial goods. A typical molding process for these composite sheets is compression molding in which the moldable composite sheet is heated, pressed into a mold, and subjected to pressure in a relatively cold mold to form the molded part. The resin and reinforcement material flow during the molding process to fill out the entire volume of the mold.

A critical aspect of molded composite products is the product mechanical properties. Measured properties typically include flexural strength/modulus, tensile strength/modulus, and impact strength. The amount and type of reinforcing fibers in the composite greatly affect the mechanical properties of the product. Generally, in a glass fiber reinforced composite material, the higher the glass/resin ratio, the stronger the product. However, since the fiberglass reinforcements are more expensive on a weight basis than the resin, composite manufacturers have sought to design moldable composite sheets having as low a glass/resin ratio as possible while still meeting target mechanical properties. Also, specific fiber surface coatings or sizes have been developed to increase the glass fiber strength and handleability, and to enhance the bonding of the glass fiber reinforcement to the resin matrix.

One widely used moldable composite sheet is available from Azdel, Inc., Shelby, N.C. The Azdel® moldable composite sheet uses a needled continuous strand mat combined with polypropylene. The glass fiber strands in the continuous strand mat are generally long, and each of the strands contains numerous filaments, with generally at least 50 filaments per strand. The Azdel composite sheet is formed by extruding three continuous sheets of resin interspersed with two continuous strand mats. By using previously formed reinforcing mats in the process, impregnation of all of the filaments by the resin is very difficult, and the reinforcement fibers tend to be concentrated in two horizontal layers, and the reinforcements are not generally uniformly distributed throughout the vertical cross-section of the product.

Wiggins Teape Group Ltd, Basingstoke, England, has developed a process (the "Radlite®" process) in which glass and polypropylene are mixed in a slurry, and then cast into sheets. The slurry mixing process necessarily causes fiber breakup, resulting in an average fiber length less than about 5 cm. Another widely used moldable composite sheet is the Taffen® sheet manufactured by Exxon Corporation, Houston, Tex. Exxon produces the Taffen® sheet with a process similar to the Radlite process by adding a thermoplastic polymer material (polypropylene) to a glass fiber wet process mat.

Composites Products Inc. (CPI), in Winona, Minn., uses a dual-screw apparatus to uniformly mix and compound long chopped glass fibers (up to about 3 cm) with resin to form a mass of composite material which can be molded. The glass fibers in the CPI product end up having an average length up to about 0.5 cm due to the forces applied to the fibers during the compounding process.

One of the problems of prior art GMT systems using a preformed mat, such as a continuous strand mat, is that a preformed mat of glass fibers is difficult to impregnate and wet out in a subsequent resination step. Some GMT manufacturers have tried to enhance impregnation by decreasing the porosity of the mat or increasing the length of the fibers, but the only way to maintain the glass loading required for the mechanical properties of the ultimate composite product is to group or bundle the reinforcement fibers into strands. This hinders the ability to provide a uniform distribution of the reinforcements within the resin matrix, since the bundles of glass fiber reinforcements are not easily dispersed.

It would be desirable to provide a moldable composite sheet having increased mechanical properties when compared to existing moldable composite products. Also, it would be advantageous if such an improved product would make the optimum use of the glass fiber reinforcement materials, which would mean that the reinforcing fibers would be uniformly distributed throughout the composite product rather than concentrated in a few specific horizontal layers.

DISCLOSURE OF INVENTION

There has now been developed an improved moldable composite sheet in which the reinforcing fibers are very uniformly distributed throughout the resin matrix. The fibers are arranged in a multiplicity of distinct layers to ensure uniformity throughout the composite. The composite has at least 5 reinforcement layers and preferably at least 7 reinforcement layers per mm of thickness of the composite. The preferred method for making the composite of the invention is to use a rotary cofiberizing process in which the reinforcement fibers and the resin material are simultaneously centrifuged with adjacent spinners. A Rotary cofiberizing process is disclosed in U.S. Pat. No. 5,458,822. This cofiberizing process ensures that the reinforcement fibers are thoroughly intermingled with the resin. The rotary cofiberizing process ensures that the reinforcement fibers are generally in the form of monofilaments, and this enables a very thorough and intimate contact between the fibers and the resin matrix, thereby enhancing the mechanical properties of the composite sheet. Preferably, the fibers are long, having an average length greater than about 10 cm prior to consolidation, for additional mechanical properties.

Preferably, at least 85 percent of the reinforcement fibers are monofilaments. The composite sheet is capable of flowing during compression molding to the extent of increasing its area by at least 50 percent, and preferably more.

In a specific embodiment of the invention, the mineral fibers are comprised of wool glass, which substantially lowers the manufacturing cost of the composite sheet by enabling the mineral fiber reinforcement materials to be produced by a rotary cofiberizing process. The mineral fibers have a generally random orientation in the plane of the composite sheet, and have very good mechanical properties when considering tensile strength/modulus, flexural strength/modulus, and impact strength.

In another specific embodiment of the invention, the composite includes additional fibers in the form of bundles having lengths greater than about 0.5 cm and containing an average of at least about 50 fibers per bundle. The preferred material for these additional fibers is E glass. The composite sheet of the invention can be made in combination with a surfacing sheet of thermoplastic material, and the surfacing sheet can be reinforced with reinforcement fibers which are included an amount within the range of from about 5 to about 25 percent by weight of the surfacing sheet.

BRIEF DESCRIPTION OF DRAWINGS

FIG. 2 is a schematic view in perspective of the composite sheet of the invention as it is being placed in a compression mold.

FIG. 3 is a schematic view in perspective of the composite sheet of FIG. 3 after compression molding.

FIG. 4 is a schematic view in elevation of a prior art composite sheet having individual reinforcement fibers randomly spaced throughout the resin matrix.

FIG. 5 is a schematic view in elevation of a prior art composite sheet having a mat of reinforcement fibers distributed throughout the resin matrix.

BEST MODE FOR CARRYING OUT THE INVENTION

The invention will be described in terms illustrating reinforcement of the composite sheet with glass fibers, although it is to be understood that the invention can be practiced using reinforcements of other heat softenable mineral material, such as rock, slag, and basalt. Also, the invention can be practiced using organic reinforcement material, examples of which include polymers such as polypropylene.

Figure 1:
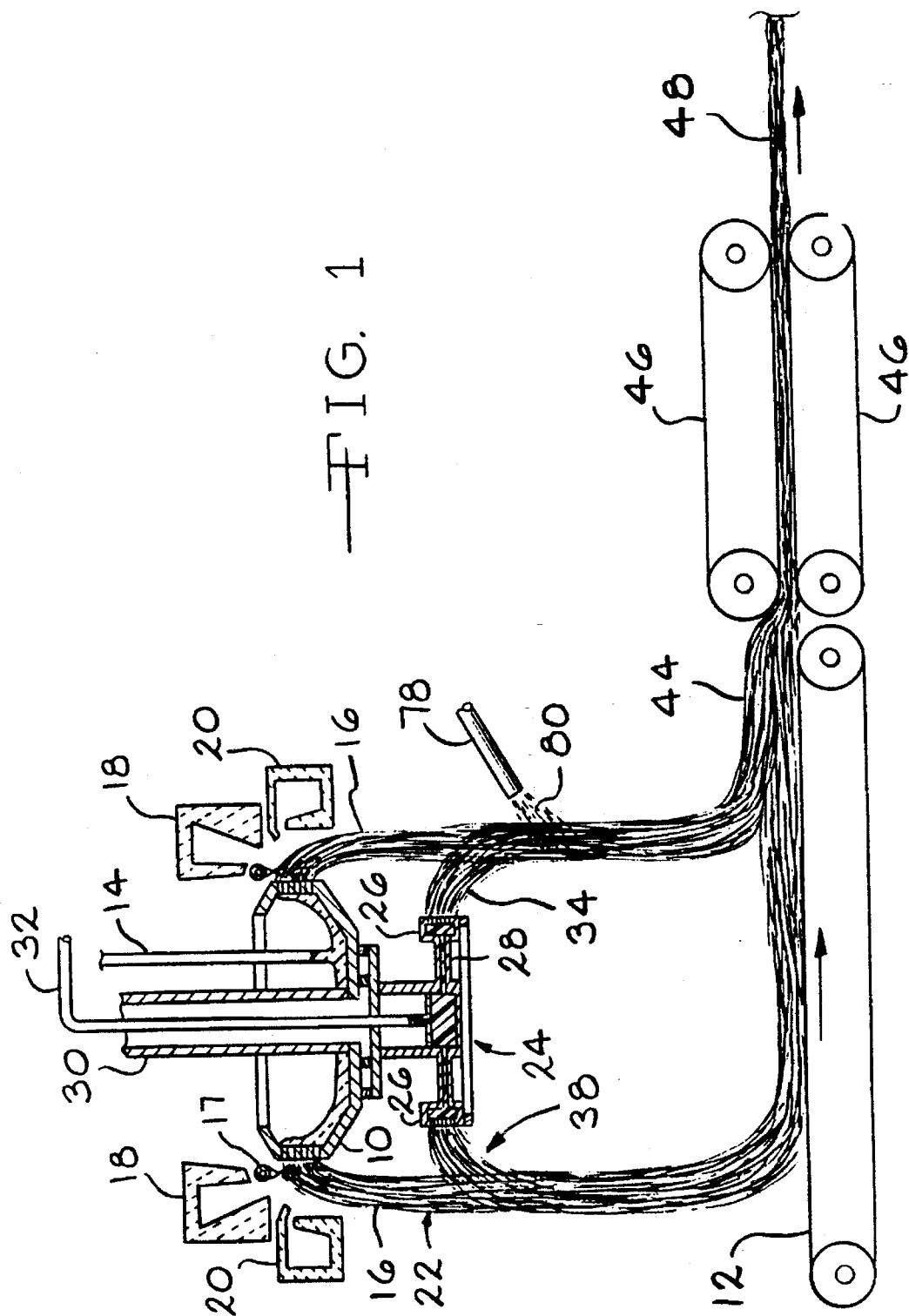
FIG. 1 is a schematic view in elevation of a glass fiber spinner and an organic fiber spinner for cofiberizing centrifuged glass fibers with polymeric material to produce a composite sheet of the invention.

As shown in FIG. 1, a rotary mineral fiber spinner, such as glass fiber spinner 10, is arranged above a collecting surface, such as conveyor 12. The glass fiber spinner can be any device suitable for the rotary centrifugation of glass fibers from molten glass. Examples of rotary fiberizers are well known in the art. A stream of molten glass 14 is dropped onto the bottom of the glass fiber spinner, and the molten glass is centrifuged through the orificed spinner peripheral wall to form glass fibers 16. The glass is preferably a wool glass of the type typically used for the rotary process, often referred to as a sodium-aluminum borosilicate glass. A common composition would include in parts by weight approximately 6 percent CaO, 5 percent $B_2O_3$, 4 percent MgO, and 15 percent $Na_2O$, with the remainder of the composition being primarily alumina and silica. The amount of soda ($Na_2O$) is preferably at least 10 percent, and more preferably at least 12 percent by weight. Optionally, a size can be applied to the glass fibers via an annular applicator ring 17 positioned immediately radially outwardly from the spinner. A preferred size comprises a polyolefin emulsion, a silane coupling agent, and an organic acid, as described in U.S. Pat. No. 4,448,917 to Black et al.

The glass fiber fiberizer can be equipped with an annular burner 18 to facilitate the fiberizing process, although in some glass fiber operations an external burner is not required. An annular blower 20 can also be used to turn the glass fibers downward to form a downwardly moving column of glass fibers and hot gasses, such as glass fiber veil 22.

Mounted generally coaxially with the glass spinner is an organic fiber spinner, such as polymer fiber spinner 24. The spinner can be similar to conventionally used spinners for fiberizing glass, or alternatively can be comprised of a plurality of rotating polymer distributing devices, such as nozzles 26. The nozzles can be disposed at the ends of a plurality of delivery conduits, such as pipes 28. The polymer fiber spinner can be rotated by any suitable device, such as by spindle 30. Molten organic material, such as polymer material, is delivered to the polymer fiber spinner by any suitable means, such as conduit 32. The molten polymer material is fed through the pipes to the nozzles and centrifuged into polymer fibers 34. Each nozzle can be adapted with up to 1,000 orifices or more for centrifuging free streams of polymer material. After the polymer fibers are formed, they are turned into a downwardly moving veil 38 of polymer fibers.

Although the preferred organic material is a thermoplastic resin, it is to be understood that any organic material capable of being distributed in a cofiberizing process can be used as the resin of the invention. Particularly useful examples of polymers include such material as poly(ethylene terephthalate) (PET), polypropylene or poly(phenylene sulfide) (PPS). Other organic materials possibly suitable for fiberization include thermoplastic resins, particularly from the group consisting essentially of other polyolefins, polyamides, polyesters, polysulfides, polycarbonates, urethanes and asphalt, or combinations thereof. Also potentially useful with the invention are thermoset resins, particularly those from the group consisting essentially of epoxies, polyesters, phenolics and urethanes, or combinations thereof.

The glass fiber veil 22 and the polymer fiber veil 38 overlap, thereby cofiberizing or integrating the glass fibers 16 and polymer fibers 34. The polymer fibers can be of any size. The integrated glass fibers and polymer fibers are collected on the conveyor as an integrated or cofiberized mass 44 of polymeric material and glass fibers. Preferably, the mineral fibers comprise an amount within the range of from about 20 to about 55 percent by weight of the composite. Additional materials, such as fillers, fire retardants, antioxidants, and electrically conductive particles or fibers, can also be added. In a subsequent step, the integrated mass of glass fibers and polymer material can optionally be treated with a heating device, such as heated double belt press 46, to produce a consolidated product, such as pressed composite sheet 48. Alternatively, the integrated mass 44 can be heated prior to being subjected to the double belt press. Other in-line processes for consolidation can be used. The consolidation step compacts the composite sheet and removes the air voids in the material. Consolidation typically results in a composite sheet with a density within the range of from about 0.4 to about 2.0 g/cm$^3$, and preferably a density for polypropylene within the range of from about 0.96 to about 1.28 g/cm$^3$. The preferred density for PET would be higher, as will be appreciated by those skilled in the art. Although the consolidation step is shown as an in-line operation, consolidation can occur in a subsequent operation. Also, two or more consolidation steps can be carried out, with the reconsolidation step serving to further compress out any voids in the composite sheet.

The length of the glass fibers introduced during the cofiberizing process into the integrated mass 44 can be controlled by several factors, such as the action of the blower, the temperature of the fiber forming environment, the glass composition, and the amount of fiber-to-fiber interference experienced by the nascent glass fibers immediately after forming, as is well known in the art. Preferably, the fibers have an average length greater than about 10 cm, and more preferably greater than about 15 cm, as determined by measuring the lengths of bare glass fibers captured in the fiber forming process prior to addition of resin.

The heat of the hot gases may cause some of the polymer fibers coming into contact with the veil to become softened to the extent that they lose their fibrous form and become attached to the mineral fibers. Since the glass fiber spinner normally operates at a temperature above 1,700° F., the polymer fibers are rapidly thrust into a region of high temperature, causing the polymer fibers to soften. Under certain conditions some of the polymer fibers will melt, forming droplets or other particles which attach themselves to some of the mineral fibers. Others of the polymer fibers retain their fibrous shape, resulting in the presence of polymer fibers on the conveyor. It is possible that all of the polymer fibers would melt or otherwise deform so that they are no longer in a fibrous form. Therefore, what is collected on the conveyor may be not just glass fibers and polymer fibers, but rather may be glass fibers and polymer material in non-fibrous form.

As shown in FIGS. 2 and 3, the consolidated sheet 48 of the invention can be molded with a thermoplastic compression molding process in any suitable mold, such as compression mold 50 having mold bottom or base 52 and mold top 54. The result of the molding process is composite product 56. In a typical compression molding process the composite sheet is heated in an infrared oven to a temperature sufficient to significantly soften the resin. For polypropylene this might be in the range of from about 200 to about 260° C. After the resin is well softened, the softened composite sheet is placed in a relatively cool mold, and the mold is closed for molding. The mold temperature is typically at a temperature of about 75° to about 150° C. below the softening point or melting point of the resin. For polypropylene the mold temperature might be within a temperature range of from about 30 to about 100° C. After being in the mold under pressure for about 45 to about 90 seconds, the molded composite product is removed. The temperature reached during the softening step, and the temperature, pressure and mold time of the molding step, will depend on the materials used and the size and shape of the article to be molded.

It is to be understood that the GMT composite sheet of the invention can be used with other types of molding processes, such as flow molding, vacuum forming, injection molding, and blow molding, all of which are well known in the art.

As shown in FIG. 4, one type of prior art composite sheet 58 has individual reinforcement fibers 60 randomly spaced throughout the resin matrix 62. Typically the fibers are chopped strands, with each strand initially containing several hundred or more filaments. The desirable randomness of the spacing of the reinforcement fibers is achieved only after considerable mixing of the resin and the reinforcement fibers, thereby resulting in significant shortening of the fibers. The fiber length for such a composite sheet is typically much less than about 1 cm. The mixing is also useful to break up or partially defilamentize the bundles of fibers into individual filaments. Unfortunately, the shortened fibers do not provide the best reinforcement possible for the composite sheet, and do not provide the same mechanical properties on a weight basis when compared to longer fibers.

The prior art composite sheet 64 shown in FIG. 5 is made by impregnating a glass fiber reinforcing mat 66 with a resin matrix 68. The reinforcing mat 66 is typically one or more thin mats of either the continuous strand mat type or the wet laid mat type. Each of these two types of mats uses fibers produced from a stationary continuous fiber feeder or bushing. Typically, such bushings produce on the order of 2,000 continuous fibers or filaments per bushing at a throughput of up to about 70 Kg./hr. or more. The fibers are mechanically attenuated by a rotating collet or pull wheel.

During the fiber forming process the fibers are coated with a size which protects the fibers from abrading and provides a coupling agent to enhance the bonding between the reinforcement fibers and the resin matrix. The resin 68 can be added to the glass fiber mat 66 by flooding the mat and impregnating with the resin in liquid form, or the resin can be added in a powder form. Since the composite sheet 64 is made using a preformed mat, there may be areas of resin with little or no reinforcement fibers present, and the reinforcement fibers of the composite sheet may have difficulty flowing into small concave areas of the mold.

Figure 6:
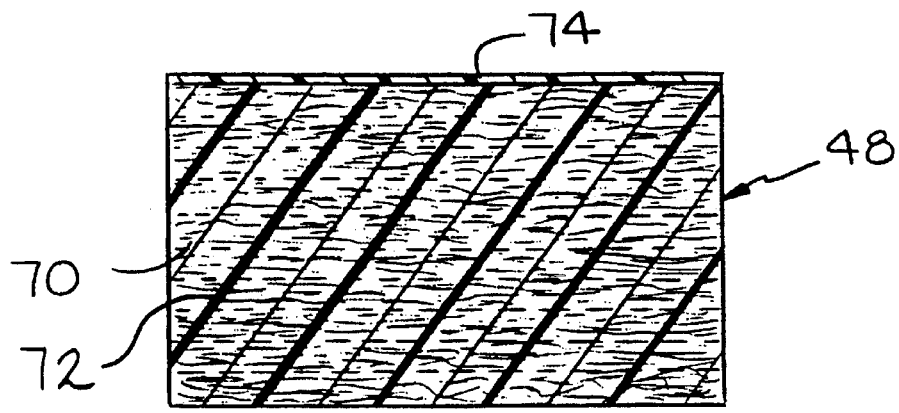
FIG. 6 is a schematic view in elevation of the composite sheet of the invention where reinforcement fibers are present in the form of a multiplicity of distinct layers according to the invention.

The composite sheet 48 of the invention, shown in FIG. 6, includes glass fibers 70 and polypropylene resin matrix 72. Since the glass fibers are introduced into the resin during the rotary fiber forming and collecting process, the fibers are generally evenly distributed throughout the matrix, resulting in virtually no areas of the composite sheet having a lack of reinforcement fibers. Further, since the fibers are formed with a rotary process, the fibers are primarily monofilaments. Preferably, at least 85 percent of the fibers (as determined by visual inspection of the integrated mass prior to consolidation) are monofilaments, thereby providing the most efficient type of reinforcement possible. The fact that the fibers are not connected in the form of a preformed mat, such as a continuous strand mat, wet laid mat or even a glass wool blanket, means that the reinforcement fibers can more effectively flow with the resin into detailed concave portions of the mold. The fact that the fibers are made by the rotary process results in a reduced manufacturing cost of the fibers, and ensures that the fibers are in the form of monofilaments. The nature of the cofiberizing process results in intimate intermingling of the resin and the reinforcement fibers.

A surfacing sheet, such as a polycarbonate surfacing sheet 74, can be applied to the composite sheet 48 to facilitate the molding process or to provide desirable surface characteristics in the finished, molded composite product 56. The surfacing sheet can be applied either before or after the consolidation step. Preferably, the surfacing sheet is reinforced with reinforcement fibers which are included an amount within the range of from about 5 to about 25 percent by weight of the surfacing sheet.

EXAMPLE I

A sample composite sheet similar to that shown in FIG. 6 was produced using a rotary cofiberizing process. The sample composite was comprised of about 68 percent by weight of a Montell 35 MFR polypropylene resin and about 32 percent by weight rotary wool glass fibers. The resin and glass fibers were cofiberized using a 38 cm diameter glass spinner and a 25 cm diameter polymer spinner. The glass fibers had a diameter within the range of from about 10 to about 15 microns. The sample composite sheet was consolidated by first heating the sheet to a temperature of about 232° C. in a nitrogen purged oven. The heated sheet was then compression molded at 8.6 MPa in a 30×30 cm square sheet mold at a temperature of about 100° C. to form a consolidated composite sheet. The mechanical properties are shown in Table I.

EXAMPLE II

The composite sheet of Example I was molded into a test tray. In the molding process, the 30 cm by 30 cm sheet was divided into three pieces, two measuring 8 cm×22 cm and one measuring 22 cm×22 cm, in order to facilitate mold filling in the compression step. The composite material was heated for 6 minutes in a nitrogen purged oven at 238° C. and pressed at 8.6 MPa to form a tray. The tray consisted of a 26 cm×27 cm base, a pair of central ribs, each measuring 2.5 cm high×26.3 cm long×0.3 cm thick, and four sidewalls, two of which were 2 cm high and two of which tapered from 2 cm in height to 5 cm in height. During the molding process the composite sheet flowed to the extent of increasing its area by at least 50 percent. After compression molding the molten sheet was found to have flowed into the ribs and sidewalls, filling each completely with resin and glass. Further characterization of the tray showed that the amount of resin within the ribs, base, and sidewalls did not vary by more than about 1 percent from the average, indicating a good, even flow of resin and glass throughout the tray. Mechanical properties were determined from the flat base portion of the tray and are shown in Table I. The data from Table I indicate that the mechanical properties of the GMT composite sheets of the invention are comparable to those of existing commercially available composite sheets.

TABLE I

| Sample | Tensile Strength (MPa) | Tensile Modulus (GPa) | Flexural Strength (MPa) | Flexural Modulus (GPa) | Notched Izod Impact (J/M) |
|---|---|---|---|---|---|
| Example I | 95.8 | 5.48 | 128.9 | 4.96 | 332 |
| Example II | 95.2 | 5.17 | 168.9 | 7.24 | 418 |
| ASTM Method | D 638 | D 638 | D 790 | D 790 | D 256 |

Figure 7:
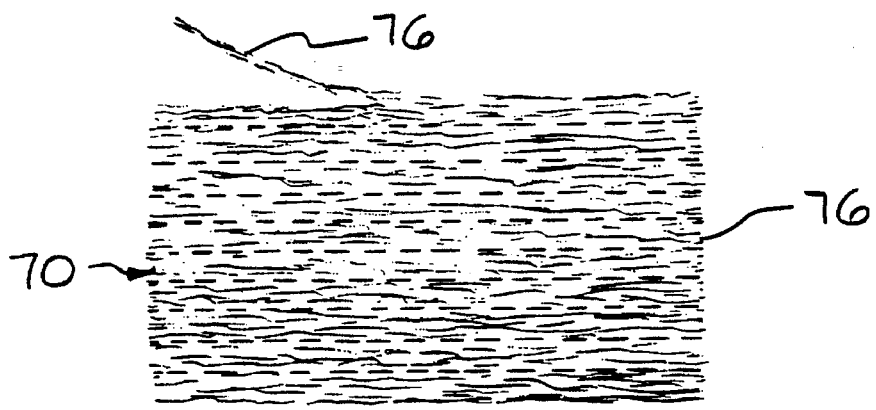
FIG. 7 is a schematic view in elevation of the layers of reinforcement fibers of the composite sheet of FIG. 6, with the resin burned off.

The glass fiber reinforcement 70 in the composite sheet 48 is characterizable in that the rotary cofiberizing process lays down the glass fibers in a manner which forms generally horizontal layers of glass fibers. In order to examine the fibrous structure, the composite sheet can be burned to remove the resin from the glass fiber reinforcement. The composite product (or the composite sheet) is heated to a temperature above the decomposition temperature of the resin but below the fuse temperature of the glass. As shown in FIG. 7, the glass fibers are generally arranged in layers, 76. The horizontal layers can be peeled off one at a time in generally distinct layers. The layers can be pulled apart in a manner similar to pulling apart layers of doilies. A 4 mm thick composite sheet of the invention has at least 10 layers, preferably at least 20 layers, and most preferably at least 30 layers 76 of reinforcement fibers. In most cases there will be at least 3 layers per millimeter of thickness. Preferably, the burned off composite sheet will have at least 5, and more preferably at least 7 layers per millimeter of thickness.

EXAMPLE III

A section was cut out of a composite sheet similar to that described in Example I. The section had dimensions of 4 cm by 4 cm, and was about 4 mm thick. The section was placed in an oven at a temperature of about 480° C. for 1 hour to burn off the polypropylene resin. The resulting reinforcement fibers appeared to be in numerous layers. The layers were removed by hand, using tweezers and a small flat spatula, and at least 30 separately identifiable layers were removed one at a time from the sample. Each layer had approximately the same dimensional area (4 cm by 4 cm) as the original sample, and showed integrity because of the long nature of the reinforcement fibers.

EXAMPLE IV

Burn tests similar to that described in Example III were performed on 4 cm×4 cm samples of commercially available prior art composite sheet materials after heating and reconsolidating into a 30 cm×30 cm sheet using the molding process described in Example I. After having the resin burned off, a reconsolidated Azdel® composite product showed 4 to 6 distinct layers of reinforcement fibers, depending on the sample. After having the resin burned off, a Taffen® composite product showed at most 14 distinct layers of reinforcement fibers, but because of the short nature of the reinforcement (less that 3 cm in length), the layers were not easily separated and exhibited a lot of interlaminar connection. The Taffen composite did not have much product integrity.

As shown in FIG. 1, bundles of additional fibers can be introduced into the composite sheet via any suitable means, such as a nozzle 78. These additional fibers can be any type of reinforcement appropriate for strengthening the composite product. A preferred additional reinforcement is bundles 80 of E glass fibers, with the bundles initially containing at least 50 and preferably 100 or more filaments. Typically, the additional glass fibers have lengths greater than about 0.5 cm.

EXAMPLE V

A composite sheet was prepared in a manner similar to that in Example I except that chopped bundles of E glass filaments were introduced into the cofiberizing process at a rate sufficient to result in a composite sheet having about 33 percent E glass by weight of the total glass in the composite sheet. The E glass bundles each initially contained about 100 filaments, and the bundles were initially about 1.5 cm to 3 cm in length. When compared with substantially the same composite product not having the added bundles, the notched IZOD impact strength increased by about 200 percent.

Figure 8:
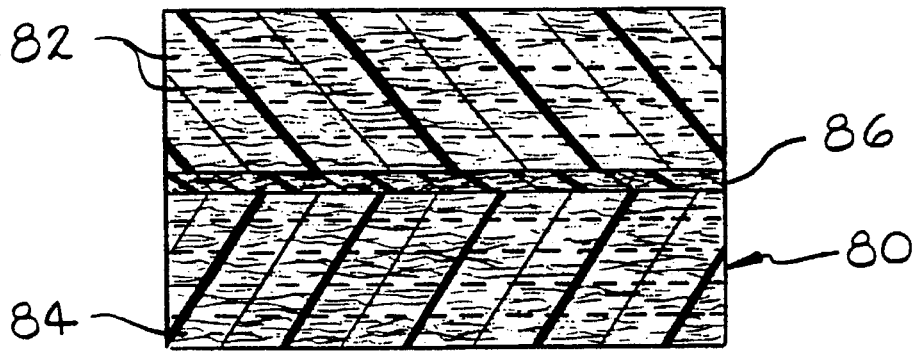
FIG. 8 is a schematic view in elevation of the composite sheet of the invention where an additional reinforcement mat is added to the composite sheet.

As a variation of the composite sheet shown in FIG. 6, an additional reinforcing layer can be added to the cofiberized material prior to consolidation to enhance the mechanical properties of the molded composite product. This additional reinforcing layer can be any material suitable for increasing the properties of the composite. Also, any number of mats or layers can be used as an additional reinforcement, and such additional reinforcement layers can be positioned in any pattern or location within the composite, including on the surface of the composite. A preferred additional reinforcing layer is a mat of E glass fibers, either a wet-laid mat or a continuous strand mat. This mat could easily be introduced into the cofiberizing process, particularly if two cofiberizing units, each having a glass spinner and a polymer spinner, were used. As shown in FIG. 8, the reinforced composite sheet 80 includes rotary glass fibers 82, resin 84 and a wet-laid E glass mat 86.

It will be evident from the foregoing that various modifications can be made to this invention. Such, however, are considered as being within the scope of the invention.

INDUSTRIAL APPLICABILITY

The invention can be useful in the manufacture of thermoplastic articles suitable for molding into parts for automobiles, cabinetry for computers and other electronic equipment, and components for small appliances and other consumer and industrial goods.

We claim:

1. A composite sheet comprising a moldable resin which consists of thermoplastic resin, thermosetting resin or mixtures thereof, and reinforcement fibers which are fibers centrifuged from a rotary process fiberizer, where the composite sheet has at least 5 distinct layers of reinforcement fibers per mm of thickness.

2. The composite sheet of claim 1 in which the reinforcement fibers have an average length greater than about 10 cm prior to consolidation.

3. The composite sheet of claim 1 in which at least 85 percent of the reinforcement fibers are monofilaments.

4. The composite sheet of claim 1 in which the reinforcement fibers are mineral fibers.

5. The composite sheet of claim 4 in which the mineral fibers are comprised of wool glass.

6. The composite sheet of claim 1 in which the composite sheet has at least 7 distinct layers of reinforcement fibers per mm of thickness.

7. The composite sheet of claim 1 in which the composite sheet has at least 30 distinct layers of reinforcement fibers.

8. A composite sheet comprising a moldable resin which consists of thermoplastic resin, thermosetting resin or mixtures thereof, and reinforcement fibers which are fibers centrifuged from a rotary process fiberizer, where the composite sheet has at least 30 distinct layers of reinforcement fibers.

9. The composite sheet of claim 8 in which the composite sheet has at least 5 distinct layers of reinforcement fibers per mm of thickness.

10. The composite sheet of claim 8 in which at least 85 percent of the reinforcement fibers are monofilaments.

11. The composite sheet of claim 8 in which the mineral fibers are comprised of wool glass.

12. A composite sheet comprising a moldable resin which consists of thermoplastic resin, thermosetting resin or mixtures thereof, and reinforcement fibers which are mineral fibers centrifuged from a rotary process fiberizer and having an average length greater than about 10 cm, where the composite sheet has at least 3 distinct layers of reinforcement fibers per mm of thickness, and where at least 85 percent of the reinforcement fibers are monofilaments.

13. The composite sheet of claim 8 in which the mineral fibers are comprised of wool glass.

14. The composite sheet of claim 8 in which the resin includes a thermoplastic resin from the group consisting essentially of polyolefins, polyamides, polyesters, polypropylene sulfides, polystyrene, ketones, polyimides, urethanes and asphalt, or combinations thereof.

15. The composite sheet of claim 8 in which the resin includes a thermoset resin from the group consisting essentially of epoxies, polyesters, phenolics and urethanes, or combinations thereof.

16. The composite sheet of claim 12 which is capable of flowing during compression molding to the extent of increasing its area by at least 50 percent.

17. The composite sheet of claim 12 including bundles of additional fibers, which are E glass fibers having lengths greater than about 0.5 cm and containing an average of at least about 50 fibers per bundle.

18. The composite sheet of claim 12 in combination with a surfacing sheet of thermoplastic material.

19. A composite sheet comprising a moldable resin which consists of thermoplastic resin, thermosetting resin or mixtures thereof, and reinforcement fibers which are mineral fibers centrifuged from wool glass in a rotary process fiberizer, where the composite sheet has at least 5 distinct layers of reinforcement fibers per mm of thickness, where at least 85 percent of the reinforcement fibers are monofilaments, and where the composite sheet is capable of flowing during compression molding to the extent of increasing its area by at least 50 percent.

* * * * *